United States Patent [19]

Sugimoto et al.

[11] 4,189,420

[45] Feb. 19, 1980

[54] POLYOLEFIN RESIN COMPOSITION AND METHOD FOR MAKING POLYOLEFIN FILM

[75] Inventors: Masaaki Sugimoto; Yoshio Matsumoto; Nobushige Ikeya; Koichi Hasegawa, all of Kurashiki, Japan

[73] Assignee: Mitsubishi Chemical Industries, Ltd., Tokyo, Japan

[21] Appl. No.: 928,965

[22] Filed: Jul. 28, 1978

[30] Foreign Application Priority Data

Aug. 4, 1977 [JP] Japan ................................. 52-93522

[51] Int. Cl.$^2$ ............................................. C08K 5/11
[52] U.S. Cl. ................................................. 260/31.6
[58] Field of Search ............... 260/31.6, 897 A; 526/5

[56] References Cited

U.S. PATENT DOCUMENTS

| 2,584,998 | 2/1952 | Filachione | 260/31.6 |
|---|---|---|---|
| 3,356,765 | 12/1967 | Musso | 260/897 A |
| 3,894,120 | 7/1975 | Frese | 260/897 A |
| 3,900,534 | 8/1975 | Schard | 260/897 A |
| 4,105,619 | 8/1978 | Kaufman | 260/897 A |

*Primary Examiner*—Paul R. Michl
*Attorney, Agent, or Firm*—Oblon, Fisher, Spivak, McClelland & Maier

[57] ABSTRACT

A polyolefin resin composition obtained by mixing a polyolefin resin with minor proportion of a polybutene of low molecular weight, a mixed glyceride containing a lower acyl group and a higher acyl group, and preferably a surface wetting agent, is used to form a polyolefin film, which is thereafter aged. The thus formed film exhibits very excellent adhesion strength as well as very good transparency and physical strength, and is therefore suitable for use as a food packaging film.

15 Claims, No Drawings

POLYOLEFIN RESIN COMPOSITION AND METHOD FOR MAKING POLYOLEFIN FILM

FIELD OF THE INVENTION

This invention relates to novel polyolefin resin compositions and also to a method for making adhesive polyolefin films from such compositions.

DESCRIPTION OF THE PRIOR ART

Adhesive films have utility in various fields, such as for food packaging films. In particular, they find utility as wrapping films for domestic use, or stretch films for business use. They are also used as so-called masking films for decorative laminates, for steel plates, or the like. The range of possible applications is quite wide. Most commercial wrapping films or stretch films are made of vinyl chloride-based resins, such as polyvinyl chloride and polyvinylidene chloride. However, these resins have several commercially disadvantageous properties: they are difficult to burn and difficult to dispose of, since they generate harmful gases upon combustion.

In order to overcome these disadvantages, research has focused on the use of chlorine-free resins in the preparation of adhesive films. Although several chlorine free resins which can be made into films having good self adhesion properties have been identified, such films suffer from relatively high production costs, since such resins are not "widely employed resins".

Accordingly, interest has been expressed in using inexpensive polyolefin film as an adhesive film. For example, Japanese Patent Laid-Open specification No. 54472/74 describes the production of adhesive films from a polyolefin resin which has been admixed and kneaded with certain proportions of two types of polybutene having different molecular weight distributions. In our Japanese Patent Laid-Open specification No. 27451/77 we proposed that a composition comprising a polyolefin resin, a polyolefin of low degree of polymerization and a tackifier can give adhesive films which have good adhesiveness and excellent physical strength. It has been also found, as described in our Japanese Patent Laid-Open specification No. 152458/77 that the adhesiveness of films obtained from the above-mentioned composition is enhanced by age after formation of the films.

Although adhesive films of the above type have a favorably high peel strength in shear (i.e., the adhesion strength as determined by pulling two superposed films in parallel and opposite directions along the film surfaces), their peel strength at 180° (which will be hereinafter be referred to as 180° peel strength, and which means an adhesion strength, as determined by peeling two superposed films from each other in opposite directions or in directions vertical to the superposed films such that the peeled portion of the films make an angle of 180°) is unfavorably greater than required. As a result, these films are characterized by poor packing efficiency making it difficult to unwind a once wound film and making manual packing difficult. Moreover, these films are so unsatisfactory in transparency that wrapped articles often appear to be cloudy or obscure, rendering such film unsuitable for use in food packaging. There is accordingly a strong demand for adhesive films having excellent properties which overcome the above-described disadvantages.

SUMMARY OF THE INVENTION

Accordingly, it is one object of the present invention to provide a polyolefin resin composition which can yield an adhesive film which overcomes the aforementioned disadvantages.

It is another object of the present invention to provide a polyolefin resin composition from which an adhesive film can be formed, which film is characterized by excellent peel strength in shear and a reasonable level of 180° peel strength, and which is further characterized by excellent transparency.

It is a further object of the present invention to provide a method for making an adhesive polyolefin film of the aforementioned type.

These and other objects of this invention as hereinafter will become more clear from the following discussion, have been obtained by forming a film from a composition comprised of (a) a polyolefin resin admixed with minor amounts of (b) a polybutene of low molecular weight and (c) a mixed glyceride having at least one acyl group containing 2-6 carbon atoms and at least one acyl group containing 8-22 carbon atoms. The film so formed is thereafter aged. It has been found that the properties of such film is synergistically enhanced by the presence of the two minor ingredients admixed therein. That is, the film is characterized by more excellent peel strength in shear as compared with similar films formed from the same polyolefin resin with only one above-indicated ingredient used alone (individually) and then aging such film. Further, the film has a suitable level of 180° peel strength and its transparency is sufficiently high. The film is also characterized by excellent physical strength.

According to one aspect of the present invention there is provided a polyolefin resin composition which comprises a polyolefin resin, a polybutene of low molecular weight, and a mixed glyceride having at least one acyl group containing 2-6 carbon atoms and at least one acyl group containing 8-22 carbon atoms.

According to another aspect of the present invention, there is provided a method for making a polyolefin film which comprises forming a film from a polyolefin resin composition comprised of (a) a polyolefin resin, (b) a polybutene of low molecular weight and (c) a mixed glyceride having at least one acyl group containing 2-6 carbon atoms and at least one acyl group containing 8-22 carbon atoms, and then aging the film.

The resin composition preferably also contains a surface wetting agent.

DETAILED DESCRIPTION OF THE INVENTION

The polyolefin resin used as the principal component of the present composition may be commercially available polyethylene, polypropylene, ethylene-vinyl acetate copolymers, polybutene-1 or the like resins. These resins may be used singly or in combination. These resins preferably have a melt index of 0.2–10 and most preferably 0.5–7. The commercially available polyethylene useful in this invention may include copolymers of ethylene having minor amounts of other olefins such as, for example, propylene, butene, or the like monomers copolymerized therewith. Similarly, the commercially available polypropylene may include copolymers of propylene with minor amounts of other olefins, such as ethylene, butene or the like monomers.

High pressure polyethylene having a density of 0.91–0.93 (i.e., low density polyethylene) or ethylene-vinyl acetate copolymer having a vinyl acetate content of 1–20 wt% and a density of 0.91–0.94 are preferred resins.

The polybutene of low molecular weight (hereinlater referred to as polybutene) useful in the practice of the present invention should have a number average molecular weight of 450–3000, preferably 550–2500 and most preferably 1000–2500. The polybutene and the polyisobutylene may be used singly or in combination. Further, two or more types of the polybutene or polyisobutylene with different molecular weight distributions may be used together.

The mixed glycerides having at least one acyl group containing 2–6 carbon atoms and at least one acyl group containing 8–22 carbon atoms are those in which one of the three hydroxyl groups of glycerin is esterified with a lower fatty acid having 2–6 carbon atoms and another is esterified with a higher fatty acid having 8–22 carbon atoms, the other hydroxyl group either remaining free as it is or being esterified with a lower fatty acid having 2–6 carbon atoms or a higher fatty acid having 8–22 carbon atoms. For instance, diacetin or triacetin compounds may be used for this purpose.

With the triacetin compounds, all the acyl groups may be different. The higher fatty acids usable for the above purpose may be saturated or unsaturated provided that they have 8–22 carbon atoms, preferably 10–18 carbon atoms. The lower fatty acids may be any of fatty acids having 2–6 carbon atoms.

Examples of the mixed glycerides include diacetyl-monolauryl-glycerin, diacetyl-monopalmityl-glycerin, diacetyl-monooleyl-glycerin, monoacetyl-dilauryl-glycerin, monoacetyl-monopalmityl-glycerin, monoacetyl-dioleyl-glycerin, monoacetyl-monolauryl-glycerin, monoacetyl-monooleyl-glycerin, dipropionyl-monolauryl-glycerin, dicapropy-monolauryl-glycerin, dicaproyl-monopalmityl-glycerin, monoacetyl-monocapryl-glycerin, monoacetyl-monobrassidyl-glycerin, monopropyl-monobrassidyl-glycerin, monoacetyl-monoerucyl-glycerin, and the like. These mixed glycerides may be used singly or in combination.

As described hereinbefore, the composition of the present invention may further include (d) a surface wetting agent, if required. In most cases, the surface wetting agents to be used are surface active agents and include, for example, polyoxyethylene alkyl ethers, polyoxyethylene fatty acid esters, sorbitan fatty acid esters, sodium dialkyl sulfosuccinate, higher fatty acid esters of glycerin having an acyl group or groups containing 8–22 carbon atoms. These compounds may be used singly or in combination. Of these, higher fatty acid esters (mono- or di-esters) of glycerin using, as the higher fatty acid, lauric acid, palmitic acid, behenic acid, oleic acid, linolic acid, ricinoleic acid, stearic acid and the like, or higher fatty acid esters of a dimer to a pentamer of glycerin, i.e., polyglycerin, using the above-indicated fatty acids are preferred. Taking into consideration that the wettability persists over a long period of time, the higher fatty acid esters of polyglycerins are most preferred. The polyglycerol higher fatty acid esters preferably contain about 50% of a monoester and the balance of a diester and/or a triester, particularly when the polyglycerin used is diglycerin.

The polyolefin resin composition according to the invention comprises (a) the polyolefin resin admixed with (b) the polybutene of low molecular weight, (c) the mixed glyceride and (d) the surface wetting agent, if required, in the following proportions: 98.6–89% by weight of the polyolefin resin; 1–6% by weight, preferably 2–5% by weight, of the polybutene; and 0.4–5% by weight, preferably 0.5–3% by weight, of the mixed glyceride. The surface wetting agent is used in an amount below 2% by weight, preferably 0.1–1% by weight, of the composition.

Especially when the amount of the mixed glyceride is above 1 wt. % but within the above-defined range, the polybutene to be mixed with the glyceride should preferably have a number average molecular weight ranging 1000–2500.

Lesser amounts of polybutene of low molecular weight or of mixed glyceride will not impart suitable adhesive strength or good transparency to the film formed.

If, however, larger amounts of the polybutene are used, the composition will have too high a melt index, with the result that when film forming is conducted, for example, by the inflation method, the bubble (which means, in the inflation method, an expanded tube which has been extruded from dies and blown with pressurized air thereinto) will be caused to undergo a rocking motion. This renders the resulting film non-uniform in thickness, thus reducing the physical strength of the film. Further, such film has the further disadvantage that its 180° peel strength will be too great, thereby lowering packing efficiency.

Larger amounts of the mixed glyceride will not offer any significant advantage, but will result only in poor economy and also reduced film formability.

When a thick film is formed using the polybutene, and the mixed glyceride in the same concentrations, these ingredients tend to bleed out on the film surface in greater amounts. Accordingly, the desirable concentrations should be on the lower end of the above ranges when producing thick films. In general, concentrations should be chosen depending on the type of film.

The surface wetting agent generally serves also as a lubricant. Use of the agent in large amounts does not necessarily improve the surface wettability of film to any considerable extent. On the contrary, such larger amounts will not only be uneconomical, but also will slightly impede the adhesiveness of the resulting film. However, the agent is desired to be added to the resin composition in a suitable amount within the afore-mentioned range so as to prevent clouding of film surface caused by masses or droplets of water deposited thereon. Similarly to the polybutene or the mixed glycerides, the surface wetting agent will tend to migrate to the film surface and will permit the film surface to be uniformly wet with moisture over a long period of time without involving formation of masses or droplets of water.

Ordinarily polyolefin additives may also be added to the composition such as UV absorbers, heat stabilizers, slip agents, anti-blocking agents, antistatic agents or wetting agents.

In the preparation of the composition, the polyolefin resin, the polybutene and the mixed glyceride, and, if required, the surface wetting agent may be merely mixed with one another. In general, however, these ingredients are kneaded in a suitable device such as, for example, the Banbury mixer, a continuous mixer or a kneader.

The polybutene, the mixed glyceride and the surface wetting agent are not necessarily mixed within such ranges of concentrations as defined hereinbefore, respectively, in the initial stage of the mixing. The mixing may be carried out by use of a so-called master batch system in which a master batch having high concentration of the polybutene, the mixed glyceride and the surface wetting agent is first prepared and then mixed further with the balance of the polyolefin resin prior to film formation. It will be noted here that if the master batch has extremely high concentrations of the minor ingredients, the kneading prior to the film forming may not be conducted satisfactorily.

The thus kneaded composition is then subjected to film forming by any of the known methods, such as an inflation method or T die method, and the formed film is thereafter aged to give an adhesive film.

In the production of films having excellent physical strengths by the inflation or blown film extrusion technique, it is necessary to effect the film blowing at a blow-up ratio of above 4, preferably 5–7, and most preferably 6–7. The term "blow-up ratio" is intended to mean a ratio of a circumference of a final blown film, i.e., a lay-flat width ×2 to a circumference of a die slit. If the diameter of the die slit is taken as D and the lay-flat width taken as L, the blow-up ratio is expressed in terms of $2L/\pi D$. In order to produce a lay-flat or blown film at such high blow-up ratio, the polyolefin resin composition is melted in an extruder and extruded from the die slit in the form of a cylindrical tube. Then, air is blown into the tube until a predetermined blow-up ratio is attained, thereby blowing up the tube to obtain an inflated tube (hereinlater referred to as bubble). The bubble is then passed through nip rolls to a subsequent step. The blowing-up is preferably effected in two stages: The cylindrical tube is first blown up to a blow-up ratio of 2–4 and then at a final blow-up ratio above 4. When the final blow-up ratio is smaller than 4, as a result of the inclusion of small amounts of air, the resulting adhesive polyolefin film will not possess good resistance to breakage in the circumferential direction (or in a transverse direction) nor will it possess good resistance to breakage (or to longitudinal tear) in a direction parallel to the drawing direction. Film of this type thus will be easy to break upon packing. Since the inflation is conducted at such a high blow-up ratio in the practice of this invention, the forming apparatus should preferably be provided with a suitable bubble-stabilizing means to prevent undesirable "breathing" or zigzag movements of the bubble. It is to be noted that if the film is not required to have high mechanical or physical strength, the blow-up ratio may not be critically limited.

The thickness of the film is in the range of below 100μ, preferably 10–50μ. When the film is used as a wrapping or stretch film, the thickness is preferably in the range of 10–30μ, optimally 12–20μ.

One of the important features of the method according to the present invention resides in aging of the film. Even though the polybutene and the mixed glyceride contribute to an improvement of transparency by the synergistic effects, nevertheless transparency is still somewhat off.

In order to produce a film having an improved transparency and an excellent peel strength in shear, it is necessary that the film produced be aged immediately after forming.

The degree of the aging depends on the temperature of the aging atmosphere and the aging time. In general, the aging of the formed film is effected by allowing the film to stand in an atmosphere of relatively low temperature for a long period of time or by placing the film in an atmosphere of relatively high temperature for a short period of time. In order to prevent the formed film from being deteriorated in mechanical strength, it is preferred to age the film in an atmosphere of relatively low temperature. If however, the temperature is too low, a very long aging time is required to impart a high level of adhesive strength to the film, thus being disadvantageous from an industrial viewpoint. From the point of view of productivity, aging in an atmosphere of high temperature is preferred. However, too high a temperature will result in deterioration of the film and also in disappearance of molecular orientation, which tends to cause breakage of the film.

If aging is conducted in an atmosphere of relatively low temperature, the desired levels of peel strength in shear and transparency are preferably attained by controlling the aging time while maintaining the atmospheric temperature constant. Similarly, where aging is effected in an atmosphere of relatively high temperature, it is preferred from the standpoint of operation, that the atmospheric temperature be suitably controlled while maintaining the aging time constant to attain the desired levels.

In particular, when the film is formed by an inflation technique, the tubular film, with or without being cut open into one or more films by means of a slitter, is aged by (1) loosely winding the film around a reel and allowing it to stand in a thermostatic chamber in the wound condition, (2) winding the film around a core (such as a bobbin or a paper tube) and then allowing it to stand in a thermostatic chamber, or (3) continuously feeding the film, without take-up, into an isothermal atmosphere in which the film stays for a predetermined time, during which the heat treatment is conducted.

The aging conditions of temperature and time will vary depending upon the particular method used. In method (1), the film is aged, for example, at 20° C. for 2 hours–2 days, at 40° C. for 20 minutes–4 hours, at 60° C. for 2–40 minutes, and at higher temperatures for a shorter time, e.g., at 70°–90° C. for 10 seconds–5 minutes. In this state, however, aging is usually not conducted at temperatures higher than 70° C., (however, there are exceptions). This is because it is almost impossible to impart peel strength in shear and transparency uniformly to the entirety of the film within a short time. In the practical sense, the film sound around the reel is preferably aged in a temperature atmosphere of 20°–60° C. for 2 minutes–2 days.

In the method (2), the aging should be effected at temperatures above 35° C. but below 120° C. The film is allowed to stand, for example, at 40° C. for 4 hours–3 days and at 60° C. for 40 minutes–12 hours.

In the method (3), the film is thermally treated by continously feeding it in an atmosphere of 60°–150° C., preferably 80°–120° C., for at least 5 seconds. The film is withdrawn from the atmosphere before the film is heated to the melting temperature thereof, and is then wound around a core, such as a bobbin or a paper tube. When an atmospheric temperature of 100° C. is used, the residence time is sufficient to be in the range of 10–60 seconds. In the continuous aging of an adhesive film, the film is heated at a temperature of 80°–120° C. for 5–120 seconds. Suitable apparatus for conducting the continuous aging is, for example, an oven which is heated by an infrared heater or hot air. The heat treatment is carried out by passing the film through the oven.

In order to produce a film having the most desirable levels of transparency and peel strength in shear, the aging is preferably conducted in an atmosphere of a temperature ranging 20°–120° C. for a time period which is properly selected depending on the temperature chosen. Of the above-described three methods, the method (3) for thermally treating a film by being continuously fed into an atmosphere of temperature where the film can stay for a predetermined time is industrially advantageous since the treating time is short and the treating procedure is simple. The methods (1)–(3) may be applied in combination, e.g., the film may be continuously treated by the method (3) and subsequently further aged by the method (2). During aging, the polybutene of low degree of polymerization and the mixed glyceride, migrate to the film surface.

The excellent properties of the film formed from resin composition is believed to be based on the synergistic effects of the polybutene and the mixed glyceride. In this connection, however, a film which has been obtained by mere film-forming without aging will not possess the most satisfactory physical properties. In the practice of this invention, it is best to age the formed film under such conditions as described hereinabove, by which the following excellent effects are attained.

The aged film exhibits a very excellent peel strength in shear and a suitable 180° peel strength together with very good transparency and excellent physical strength as compared with films formed from a polyolefin resin composition which contains either a mixed glyceride or polybutene alone as minor components and then treated in the same manner.

The adhesive film produced according to the methods of this invention do not require additives so that the film can be suitable as a stretch film or a wrapping film for food packages.

Further, the film obtained from the polyolefin resin composition admixed with a surface wetting agent is very excellent in wettability. Thus, the film is very suitable as a packing film for perishable foods which requires high wettability.

When practically applied as a stretch or wrapping film, the adhesive film of this invention will preferably have the following adhesion strengths and physical strengths, which are determined by measuring methods as will be described hereinafter. As for the adhesion strengths, the peel strength in shear, which is a measure for tight packing ability, is above 0.4 kg/cm², and the 180° peel strength, which is a measure for packing operation efficiency is below 4 kg/50 mm, preferably below 2.5 kg/50 mm. When the transparency is expressed in terms of degree of surface haze, the degree will be below 2%, preferably below 1.3%, so that articles packed with such transparent film are observed to be good in appearance with an improved commercial value.

Having generally described this invention, a further understanding can be obtained by reference to certain specific examples which are provided herein for purposes of illustration only and are not intended to be limiting unless otherwise specified. In the examples, adhesive polyolefin films were tested by the following test methods to determine physical properties thereof.

Adhesion Strength

Peel Strength In Shear and 180° Peel Strength:

Two films are lightly superimposed in a thermostatic chamber of 20° C. and pressed three times by means of a roll of 25 mm$\phi$ and 150 mm wide at a nip pressure of 0.3 kg/cm. Within 5 minutes, the two films are subjected to measurements using the Instron type tensile tester to determine forces or strengths required for peeling the films in shear and in a direction of 180°, respectively.

|  | Measuring Conditions | |
| --- | --- | --- |
|  | Test for Peel Strength In Shear | 180° Peel Test |
| Tensile Speed | 300 mm/min | 300 mm/min |
| Length Between Chucks | 50 mm | 50 mm |
| Width of Sample | 25 mm | 50 mm |
| Adhesion Area | 25 mm × 25 mm | 50 mm × 50 mm |
| Unit | kg/cm² | g/50 mm |

Transparency

The haze is measured for evalutation of transparency according to a method as prescribed in ASTM D1003-52T.

Rate of Break

On a truncated regular quadrangular pyramid with a side of an upper section of 175 mm, a side of a lower section of 190 mm and a heights of 105 mm are placed two cylinders each having a diameter of 80 mm such that the cylinders are in parallel to one side of the upper section with regard to their central axis and contact each other.

A 300×300 mm square test piece of adhesive polyolefin film is provided such that its longitudinal direction (or a direction of drawing of film) conforms with the direction of the central axis of the cylinders and the film is fixed at one end thereof in a width of 10 mm to the pyramid at the distance, 10 mm, from the upper surface of the pyramid. Then, the two cylinders are covered with the film and the free end, in the longitudinal direction, of the film is drawn at a speed of 25 cm/sec down to a height of 40 cm from the bottom surface of the pyramid.

The above procedure is repeated for twenty test pieces and the number, n, of broken pieces is expressed in terms of "rate of break".

Wettability 300 ml of water of 20° C. is introduced into an 1l glass beaker, which is covered with a film to be tested and placed in a low temperature chamber of 3° C. 10 minutes after the placement, the degree of seeing through the tested film is evaluated with the naked eye.

The criteria for the evaluation are as follows. Excellent: The moisture deposited on the film surface is satisfactorily distributed over and an entire surface of the flm is uniformly wetted, ensuring that the inside can be fully seen through the film.

Good: Masses or droplets of water growing up to a size above 3 mm are deposited on the film surface but the inside can be most fully seen through the film.

Bad: Very fine masses of water are deposited on an entire surface of the film, making it almost impossible to see the inside through the film.

EXAMPLES 1–11

To a high pressure process polyethylene (product of Mitsubishi Chemical Ind., Ltd., available under the commercial name of NOVATEC-L, F-120) used as a ployolefin resin to be a primal component were added a polybutene of low molecular weight having a number average molecular weight of 1260 or 2350, diacetyl-monolauryl-glycerin (product of Riken Vitamin Oil Co., Ltd., available under the commercial name of PL002) used as a mixed glyceride, and diglycerol monooleate (product of Riken Vitamin Oil Co., Ltd., available under the commercial name of Rikemal 0-71D) used as a surface wetting agent in such proportions as indicated in Table 1 to obtain polyethylene resin compositions.

Each of the compositions was subjected to a film-forming procedure by a lay-flat tubing machine (made by Modern Machinery Co., Ltd., Type MKB-6, L/D=22) equipped with dies having a die slit diameter of 50 mm at a forming temperature (or a cylinder temperature) of 160° C. at a blow-up ratio of 6.5 at a take-up speed of 15 mm/min to give a 16μ thick adhesive polyolefin film.

After completion of the film forming, the film was loosely wound around a reel and then aged in the wound state in a thermostatic chamber of 20° C. or 40° C. for 24 hours. The thus aged film was measured to determine its peeling strength in shear, 180° peeling strength, haze and wettability with the results shown in Table 1.

The above procedure was repeated using resin compositions in which the same types of the polybutene and the mixed glyceride as used above were, respectively, added to the polyethylene resin in proportions outside the ranges of the present invention. The resulting films were tested in the same manner as described above. The test results are also shown in Table 1 as Comparative Examples. In the Table, abbreviations appearing in the column for "Composition" have the following meanings.

PE: polyethylene resin
PB: polybutene of low molecular weight
KG: mixed glyceride
SA: Surface wetting agent Table 1

| | No. | PE | KG | PB mol-weight =1260 | PB mol-weight =2350 | SA | Aging Temp. (°C) | Peeling Strength In Shear (kg/cm) Immediately after film-forming | 2 hrs | 24 hrs | 180° peeling strength (g/50 mm) Immediately after film-forming | 2 hrs | 24 hrs | Haze (%) Immediately after film-forming | 2 hrs | 24 hrs | Rate of Break (%) | Wettability |
|---|---|---|---|---|---|---|---|---|---|---|---|---|---|---|---|---|---|---|
| Examples | 1 | 95.6 | 1 | 3 | 0 | 0.4 | 20 | 0.57 | 0.83 | 0.86 | 1.2 | 1.7 | 1.8 | 2.3 | 1.0 | 0.9 | 0 | Excellent |
| | 2 | 95.6 | 1 | 3 | 0 | 0.4 | 40 | 0.57 | 0.87 | 0.91 | 1.2 | 1.8 | 1.8 | 2.3 | 1.0 | 0.8 | 0 | Excellent |
| | 3 | 96.0 | 1 | 3 | 0 | 0 | 20 | 0.58 | 0.87 | 0.91 | 1.3 | 1.6 | 1.8 | 2.5 | 1.2 | 1.2 | 0 | Bad |
| | 4 | 93.6 | 1 | 5 | 0 | 0.4 | 20 | 0.67 | 1.23 | 1.32 | 1.4 | 2.4 | 2.3 | 2.1 | 0.8 | 0.7 | 0 | Excellent |
| | 5 | 95.6 | 1 | 0 | 3 | 0.4 | 20 | 0.42 | 0.50 | 0.52 | 1.2 | 1.6 | 1.7 | 2.2 | 1.0 | 1.1 | 0 | Excellent |
| | 6 | 95.6 | 1 | 0 | 3 | 0.4 | 40 | 0.42 | 0.51 | 0.55 | 1.2 | 1.7 | 1.8 | 2.5 | 1.0 | 1.0 | 0 | Excellent |
| | 7 | 96.0 | 1 | 0 | 3 | 0 | 20 | 0.48 | 0.58 | 0.63 | 1.3 | 1.8 | 1.8 | 2.3 | 1.2 | 1.2 | 0 | Bad |
| | 8 | 93.6 | 1 | 0 | 5 | 0.4 | 20 | 0.51 | 1.18 | 1.25 | 1.6 | 3.1 | 3.6 | 1.5 | 0.6 | 0.6 | 0 | Excellent |
| | 9 | 94.6 | 2 | 3 | 0 | 0.4 | 20 | 0.39 | 0.56 | 0.58 | 1.0 | 1.4 | 1.5 | 1.4 | 0.6 | 0.5 | 0 | Excellent |
| | 10 | 92.6 | 2 | 5 | 0 | 0.4 | 20 | 0.48 | 0.96 | 1.08 | 1.3 | 1.8 | 1.9 | 1.4 | 0.5 | 0.5 | 0 | Excellent |
| | 11 | 92.6 | 2 | 0 | 5 | 0.4 | 40 | 0.48 | 1.01 | 1.18 | 1.3 | 1.9 | 1.9 | 1.4 | 0.5 | 0.5 | 0 | Excellent |
| Comparative Examples | 1 | 98.6 | 1 | 0 | 0 | 0.4 | 20 | 0.10 | 0.13 | 0.15 | 1.1 | 1.1 | 1.2 | 2.2 | 2.0 | 1.9 | 0 | Excellent |
| | 2 | 98.1 | 1.5 | 0 | 0 | 0.4 | 20 | 0.08 | 0.11 | 0.11 | 0.8 | 0.8 | 0.9 | 1.7 | 1.6 | 1.6 | 0 | Excellent |
| | 3 | 97.6 | 2 | 0 | 0 | 0.4 | 20 | 0.12 | 0.14 | 0.15 | 0.7 | 0.7 | 0.8 | 1.1 | 1.1 | 1.1 | 0 | Excellent |
| | 4 | 96.6 | 3 | 0 | 0 | 0.4 | 20 | 0.06 | 0.06 | 0.07 | 0.4 | 0.5 | 0.5 | 0.8 | 0.7 | 0.7 | 0 | Excellent |
| | 5 | 86.6 | 6 | 7 | 0 | 0.4 | | Uniform film could not be obtained due to instability of bubble. | | | | | | | | | | |
| | 6 | 96.6 | 0 | 0 | 3 | 0.4 | 20 | 1.14 | 1.30 | 1.35 | 4.3 | 4.9 | 5.2 | 4.8 | 3.8 | 3.6 | 0 | Excellent |
| | 7 | 94.6 | 0 | 0 | 5 | 0.4 | 20 | 1.25 | 1.55 | 1.57 | 6.7 | 7.9 | 8.4 | 4.7 | 3.9 | 3.7 | 0 | Excellent |

As will be clear from the results of Table 1, the films formed from the compositions comprised of a major proportion of the polyolefin and a minor proportion of a mixed glyceride alone without addition of both the two minor component are too low in peeling strength in shear, while those formed from the composition using a polybutene alone as minor component are poor in transparency and 180° peeling strength and thus are not practically applicable. In contrast, the films obtained from the compositions according to the present invention have excellent peeling strength in shear and a reasonable levels of 180° peeling strength as compared with any of films formed from the compositions using a mixed glyceride or a polybutene singly as minor component. This is considered to result from the synegistic effect of the mixed glyceride and the polybutene. When the films obtained immediately after the film-forming are further aged, they are improved in transparency remarkably and also in peeling strength in shear to a degree without giving any significant adverse effect on the 180° peeling strength.

Gathering from the foregoing, it can be said that the adhesive films produced according to the method of the present invention have excellent peeling strength in shear and suitable 180° peeling strength and are also excellent in transparency. In other words, the adhesive films obtained from the composition of the invention have a good packing ability, ensuring tight packing of articles. Further, the films ensures a good efficiency for packing operation and will give a good appearance to packed articles and thus are very suitable for use as stretch or wrapping films for foods.

EXAMPLES 12-14

A polyolefin film was formed by following the procedure of Example 1 using the same polyethylene resin composition as Example 1 [PE; 95.6 wt %, KG: 1 wt%, PB (number average molecular weight of 1260): 3 wt %].

Then, the film was subsequently continuously fed into an aging chamber maintained at temperatures indicated in Table 2 without winding around a core or reel. The aging was conducted for 30 seconds and 60 seconds. The thus aged films were measured to determine its peeling strength in shear, 180° peeling strength, transparency, and rate of break. The results are shown in Table 2 below.

atoms and at least one acyl group containing 8 to 22 carbon atoms.

2. The polyolefin resin composition of claim 1, wherein said ethylene-vinylacetate copolymer has a vinyl acetate content of 1-20 wt.% and a density of 0.91–0.94.

3. The polyolefin resin composition of claim 1, wherein said polybutene material has a number average molecular weight of 550–2500.

4. The polyolefin resin composition of claim 1, wherein said mixed glyceride is a diacetin or triacetin compound.

5. The polyolefin resin composition of claim 1, wherein said mixed glyceride is diacetyl-monolauryl-glycerin, diacetyl-monopalmityl-glycerin, diacetyl-monooleyl-glycerin, monoacetyl-dilauryl-glycerin, monoacetyl-monopalmityl-glycerin, monoacetyl-dioleyl-glycerin, monoacetyl-monolauryl-glycerin, monoacetyl-monooleyl-glycerin, dipropionyl-monolauryl-glycerin, dicapropy-monolauryl-glycerin, dicaproyl-monopalmityl-glycerin, monoacetyl-monocapryl-glycerin, monoacetyl-monobrassidyl-glycerin, monopropyl-monobrassidyl-glycerin or monoacetyl-monoerucyl-glycerine.

6. The polyolefin resin composition according to claim 1 wherein said polyethylene resin is a high pressure polyethylene resin having a density of 0.91–0.93.

7. The polyolefin resin composition according to claim 1, further comprising a surface wetting agent in an amount not greater than 2% by weight of said composition.

8. The polyolefin resin composition according to claim 7, wherein said surface wetting agent is an ester of glycerin and a higher fatty acid.

9. The polyolefin resin composition according to claim 7, wherein said surface wetting agent is an ester of a polyglycerin and higher fatty acid.

10. A method for manufacturing a polyolefin film, comprising:
forming a film from a polyolefin resin composition composed of (a) 89 to 98.6% by weight of polyethylene or ethylene-vinylacetate copolymer containing less than 20% by weight vinylacetate; 1 to 6% by weight of a polybutene material having a number average molecular weight ranging from 450 to 3000, and 0.4 to 5% by weight of a mixed glyceride having at least one acyl group containing 2 to 6

Table 2

| | No. | Aging Temp. (°C) | Peeling Strength in Shear (kg/cm$^2$) | | | 180° Peeling Strength (g/50 mm) | | | Haze (%) | | | Rate of Break (%) |
|---|---|---|---|---|---|---|---|---|---|---|---|---|
| | | | Immediately after film-forming | 30 sec. | 60 sec. | Immediately after film-forming | 30 sec. | 60 sec. | Immediately after film-forming | 30 sec. | 60 sec. | |
| Examples | 12 | 50 | 0.57 | 0.80 | 0.83 | 1.2 | 1.7 | 1.7 | 2.3 | 1.1 | 1.0 | 0 |
| | 13 | 70 | 0.57 | 0.85 | 0.89 | 1.2 | 1.7 | 1.8 | 2.3 | 1.0 | 0.9 | 0 |
| | 14 | 90 | 0.57 | 0.88 | 0.91 | 1.2 | 1.8 | 1.8 | 2.3 | 1.1 | 0.9 | 0 |

What is claimed is:

1. A polyolefin resin composition, comprising:
    (a) 89 to 98.6% by weight of polyethylene or ethylene-vinylacetate copolymer containing less than 20% by weight of vinyl acetate;
    (b) 1 to 6% by weight of a polybutene material having a number average molecular weight ranging from 450 to 3,000; and
    (c) 0.4 to 5% by weight of a mixed glyceride having at least one acyl group containing 2 to 6 carbon carbon atoms and at least one acyl group containing 8 to 22 carbon atoms; and aging the thus formed film under temperature conditions ranging from 20 to 120° C.

11. The method according to claim 10, wherein said polyolefin resin composition further comprises a surface wetting agent in an amount not greater than 2% by weight of said composition.

12. The method according to claim 10, wherein the film is aged by winding said film loosely around a reel and allowing the wound film to stand at a temperature of 20° C.–60° C.

13. The method according to claim 10, wherein the film is aged by tightly winding said film around a core and allowing the wound film to stand at a temperature of 35° C.–120° C.

14. The method according to claim 10, wherein the film is aged by feeding said film continuously into an atmosphere at a temperature of 60° C.–150° C.

15. The method according to claim 14, wherein said film is aged at a temperature of 80° C.–120° C. for a time of 5–120 seconds.

* * * * *